United States Patent
Hansen et al.

(10) Patent No.: US 8,834,126 B2
(45) Date of Patent: Sep. 16, 2014

(54) FAN BLADE PROTECTION SYSTEM

(75) Inventors: James O. Hansen, Glastonbury, CT (US); Joseph Parkos, East Haddam, CT (US); Thomas J. Watson, South Windsor, CT (US); Christopher J. Hertel, Wethersfield, CT (US); Kelly L. Hoover, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 695 days.

(21) Appl. No.: 13/173,691

(22) Filed: Jun. 30, 2011

(65) Prior Publication Data
US 2013/0004323 A1 Jan. 3, 2013

(51) Int. Cl.
| | | |
|---|---|---|
| *F01D 5/14* | (2006.01) |
| *C25D 11/04* | (2006.01) |
| *F04D 29/32* | (2006.01) |
| *F04D 29/02* | (2006.01) |
| *F01D 5/28* | (2006.01) |
| *B23P 9/04* | (2006.01) |
| *C25D 11/08* | (2006.01) |

(52) U.S. Cl.
CPC ............. *F01D 5/288* (2013.01); *C25D 11/04* (2013.01); *F04D 29/322* (2013.01); *F05D 2300/121* (2013.01); *F05D 2220/3217* (2013.01); *F05D 2220/36* (2013.01); *F04D 29/023* (2013.01); *B23P 9/04* (2013.01); *C25D 11/08* (2013.01); *Y02T 50/672* (2013.01); *F04D 29/324* (2013.01)
USPC ................... 416/224; 416/241 R; 29/889.71; 29/90.7; 29/458

(58) Field of Classification Search
CPC ............. F01D 5/14; F01D 5/147; F01D 5/28; F01D 5/288; F05D 2240/303; B23P 15/02; B21K 3/04; B21D 53/78; B21D 31/06; B64C 1/10
USPC ................. 416/224, 229 R, 241 R; 29/889.7, 29/889.71, 90.7, 458
See application file for complete search history.

(56) References Cited

U.S. PATENT DOCUMENTS

| | | |
|---|---|---|
| 3,892,612 A | 7/1975 | Carlson et al. |
| 4,010,530 A | 3/1977 | Delgrosso et al. |

(Continued)

FOREIGN PATENT DOCUMENTS

| | | |
|---|---|---|
| GB | 2397257 A | 7/2004 |
| WO | WO 9641068 A1 | 12/1996 |

OTHER PUBLICATIONS

U.S. Appl. No. 12/713,867, filed Feb. 26, 2010.
European Search Report, mailed Jan. 28, 2013.

*Primary Examiner* — Dwayne J White
(74) *Attorney, Agent, or Firm* — Kinney & Lange, P.A.

(57) ABSTRACT

A method for protecting a fan blade with an airfoil, a tip, a root and a sheath, the root to be inserted into a hub includes peening the airfoil of the blade; inserting a scrim cloth between the fan blade and the sheath to galvanically isolate the fan blade from the sheath; bonding the sheath to the blade with an epoxy adhesive; peening the blade root; bonding wear pads to the root with epoxy adhesive to galvanically isolate the root from the hub; applying a protective cover to the tip of the blade; and applying a coating to all exposed areas of the blade to inhibit corrosion.

18 Claims, 4 Drawing Sheets

(56) References Cited

U.S. PATENT DOCUMENTS

| | | |
|---|---|---|
| 4,589,824 A | 5/1986 | Kozlin |
| 4,842,663 A * | 6/1989 | Kramer .................. 156/98 |
| 4,895,491 A | 1/1990 | Cross et al. |
| 5,165,859 A | 11/1992 | Monroe |
| 5,375,978 A | 12/1994 | Evans et al. |
| 5,591,009 A | 1/1997 | Mannava et al. |
| 5,674,050 A | 10/1997 | Hall et al. |
| 6,059,533 A | 5/2000 | Stoker et al. |
| 7,094,444 B2 | 8/2006 | Rigney et al. |
| 7,157,151 B2 | 1/2007 | Creech et al. |
| 7,371,426 B2 | 5/2008 | Rigney et al. |
| 7,582,174 B2 * | 9/2009 | Vigneau .................. 148/565 |
| 7,371,426 B2 | 5/2008 | Rigney et al. |
| 2009/0004364 A1 | 1/2009 | Hollis et al. |
| 2011/0194941 A1 * | 8/2011 | Parkin et al. .................. 416/224 |

* cited by examiner

FAN BLADE PROTECTION SYSTEM

BACKGROUND

Titanium alloys and fiber composites are the benchmark classes of materials for fan and compressor blades in commercial airline engines. One reason for the materials being so broadly adopted is that regulations require an engine in commercial service to be capable of ingesting birds while allowing for continued operation or safe and orderly shutdown of that engine. Another reason is that blades must resist cracking from nicks and dents caused by small debris such as sand and rain. Engines with titanium fan blades as well as certain reinforced fiber composite fan blades with adhesively bonded metallic leading edge sheaths are the most common blades used to meet these criteria.

While titanium blades are relatively strong, they are heavy and expensive to manufacture. Composite blades offer sufficient strength and a significant weight savings over titanium, but they are expensive to process. Further, due to their relatively low strain tolerance, composite blades require a greater thickness than otherwise equivalent metal blades to meet bird strike requirements. Greater blade thickness reduces fan efficiency and offsets a significant portion of weight savings from using composite materials.

Blades made of aluminum or aluminum alloy can result in significant weight savings. However, aluminum alloy blades are softer and lower in strength than past titanium or composite blades. Aluminum blades are particularly susceptible to corrosion and erosion, particularly when it is in contact with a dissimilar metal, such as a titanium sheath or fan hub. Corrosion or erosion can lead to crack initiation which could result in failure of the aluminum blade. Aluminum blades are also prone to pitting from foreign object damage and sand erosion. This pitting can impart a local stress concentration and reduced fatigue capability of the aluminum alloy. A leading edge sheath made of titanium or nickel can give the aluminum blade added protection without significantly increasing the weight.

SUMMARY

A method for protecting a fan blade with an airfoil, a tip, a root and a sheath, the root to be inserted into a hub includes peening the airfoil of the blade; inserting a scrim cloth between the fan blade and the sheath to galvanically isolate the fan blade from the sheath; bonding the sheath to the blade with an epoxy adhesive; peening the blade root; bonding wear pads to the root with epoxy adhesive to galvanically isolate the root from the hub; applying a protective cover to the tip of the blade; and applying a coating to all exposed areas of the blade to inhibit corrosion.

A blade protection system includes a blade with an airfoil, a leading edge, a trailing edge, a tip and a root for inserting into a hub; a sheath to attach to the leading edge; a scrim supported epoxy to bond the sheath to the blade and galvanically isolate the blade from the sheath; wear pads to the root with epoxy adhesive to galvanically isolate the root from the hub; a cover to protect the tip of the blade; and a coating applied to all exposed areas of the blade to inhibit corrosion.

DETAILED DESCRIPTION

Figure 1:
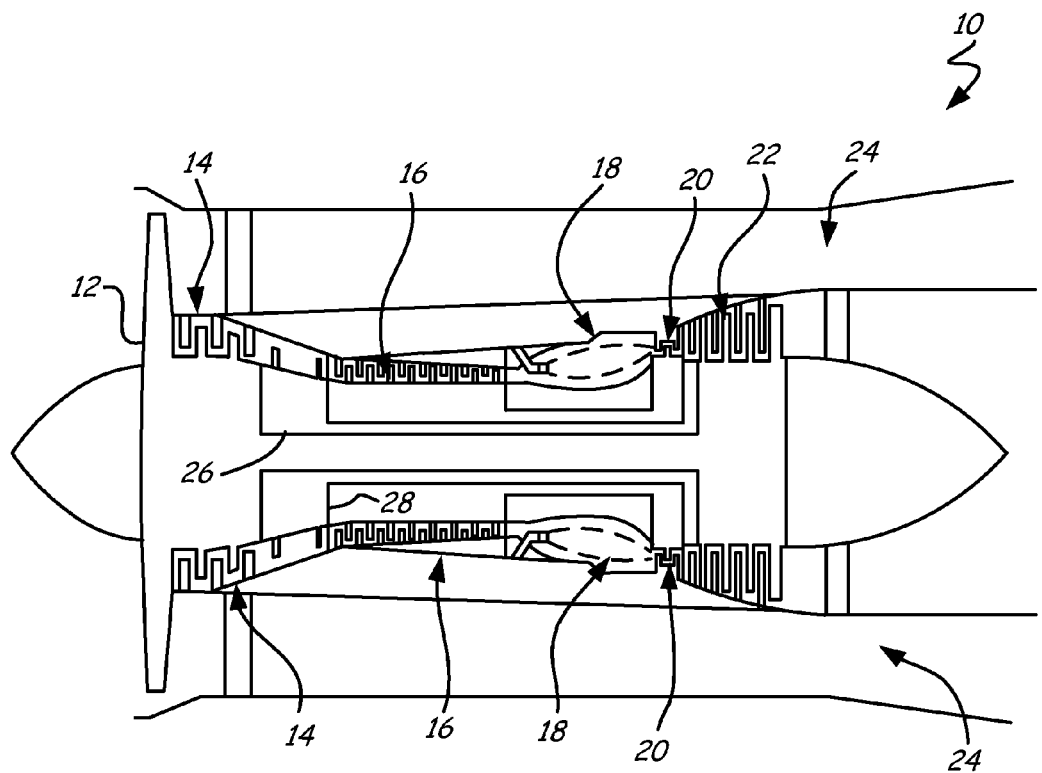
FIG. 1 schematically depicts a cross-section of a turbofan engine.

FIG. 1 shows an example of a dual-spool turbofan engine. Turbofan engine 10 comprises several sections: fan section 12, first low-pressure compressor section 14, second high-pressure compressor section 16, combustor section 18, first high-pressure turbine section 20, second low-pressure turbine section 22, bypass section 24, low-pressure shaft 26, and high-pressure shaft 28. A portion of the atmospheric air pulled in by rotation of fan section 12 is directed toward first compressor section 14, while the remainder is directed toward bypass section 24.

Air directed through first compressor section 14 is further compressed by second compressor section 16. Fuel is added and ignited in combustor section 18. Blades in turbine sections 20 and 22 capture a portion of the energy from passing combustion products by turning turbine rotors. Both fan section 12 and first compressor section 14 are rotatably linked via low-pressure shaft 26 to first low-pressure power turbine section 22. Second high-pressure compressor section 16 is rotatably connected to first high-pressure turbine section 22 via high-pressure shaft 28. Thrust is generated in engine 10 by the force of the air drawn in by fan section 12 and pushed through bypass section 24 (less any bleed air used for other aircraft functions), and by the force of exhaust gases exiting from second low-pressure turbine section 22.

Being designed to pull vast quantities of air through bypass section 24 to generate thrust, blades in fan section 12 are the first line of defense for engine 10 and are highly susceptible to both small and large scale damage from the extreme conditions of engines as well as objects pulled in with the surrounding air. Small scale blade damage through pitting, erosion, corrosion or cracking causes performance deterioration and increases the number of potential crack initiation sites, while large scale damage includes blade deformation and failure. Small impacts can lead to large scale damage by serving as crack initiation sites. Larger impacts, such as ingestion of birds can cause one or more blades to deform or break in a single event. Regulations are in place to limit the frequency and severity of single event failures because of the increased risk of emergency landings and catastrophic failure.

Aluminum alloy blades with a leading edge sheath can be used as a lower-cost and lighter-weight alternative to titanium and composite blades. However, the susceptibility of aluminum alloys to erosion and corrosion results in the need for a blade protection system to ensure that blade 30 is able to resist crack initiation and potential failure. Small-scale deterioration typically consists of pitting, nicks, dings; erosion from sand, rain, and small runway debris; and corrosion from contact with a dissimilar metal and exposure to the extreme engine environment. This deterioration occurs relatively quickly in unprotected aluminum blades regardless of their overall strength. Additionally, unprotected aluminum blades are more susceptible to unplanned failures from larger foreign object strikes, potentially requiring immediate expensive repairs, replacement, downtime for the engine, or catastrophic failure. In an example case of aluminum alloy fan blades having no additional protection, pitting and erosion can occur, thus necessitating shorter maintenance and replacement time horizons for unprotected lightweight blades. A protection system will allow use of the aluminum alloy blade, while ensuring it is sufficiently strong and durable for long-term use within an engine.

The following figures show a fan blade made of aluminum and a sheath made of titanium or nickel, and describe blade 30 protection system and process of protecting blade 30 from corrosion and erosion. Blade 30 can be adapted for use in example dual-spool engine 10 shown in FIG. 1. In addition, the example blades described below can also be readily adapted for various engine configurations, including engines having any number of spools, such as engines with single spool or three-spool construction and engines that include a gearbox that transmits drive from a spool to the fan blade.

Figure 2:
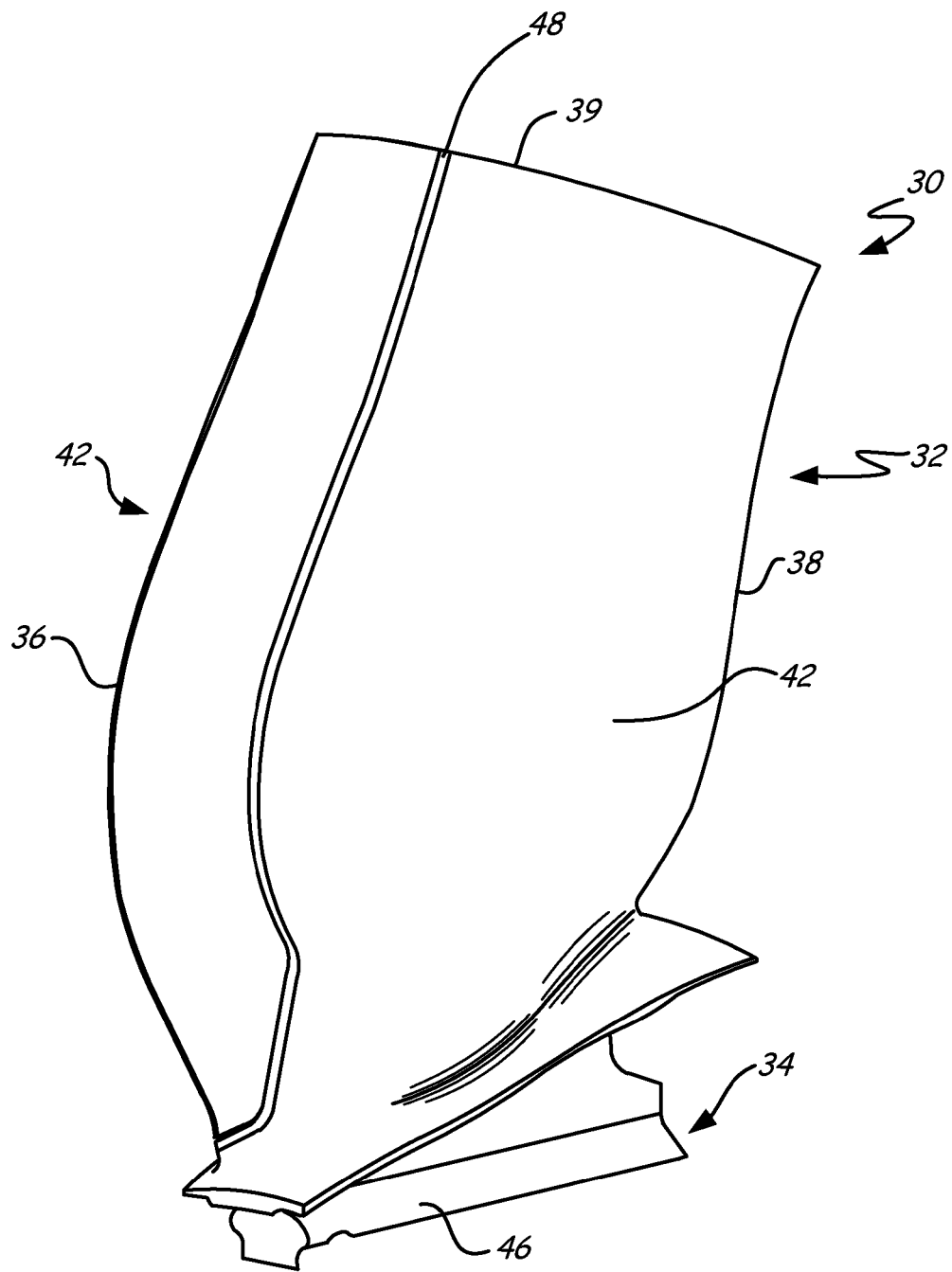
FIG. 2 shows a side view of a blade with a sheath and the corrosion protection system according to the current invention.

FIG. 2 shows a view of a blade and sheath with the corrosion protection system according to the current invention. Blade 30 includes airfoil 32, root 34, leading edge 36, trailing edge 38, tip 39, suction surface 40 and sheath 42. Pressure surface 44 is not visible in this depiction. Root 34 fits into a disc (not shown) to rotate blade 30 within fan section 12. Sheath 36 can be a titanium alloy or other material with sufficient strength to protect blade 30 in engine 10 when engine 10 is in operation. Blade 30 with airfoil 32 and root 34 can be an aluminum alloy or a similar lightweight material to provide a lightweight blade without a complicated and expensive manufacturing process. Visible elements of corrosion protection system for blade 30 in FIG. 1 include wear pads 46 on root 34 and scrim supported adhesive 48 for bonding sheath 42 onto blade 30.

Figure 3:
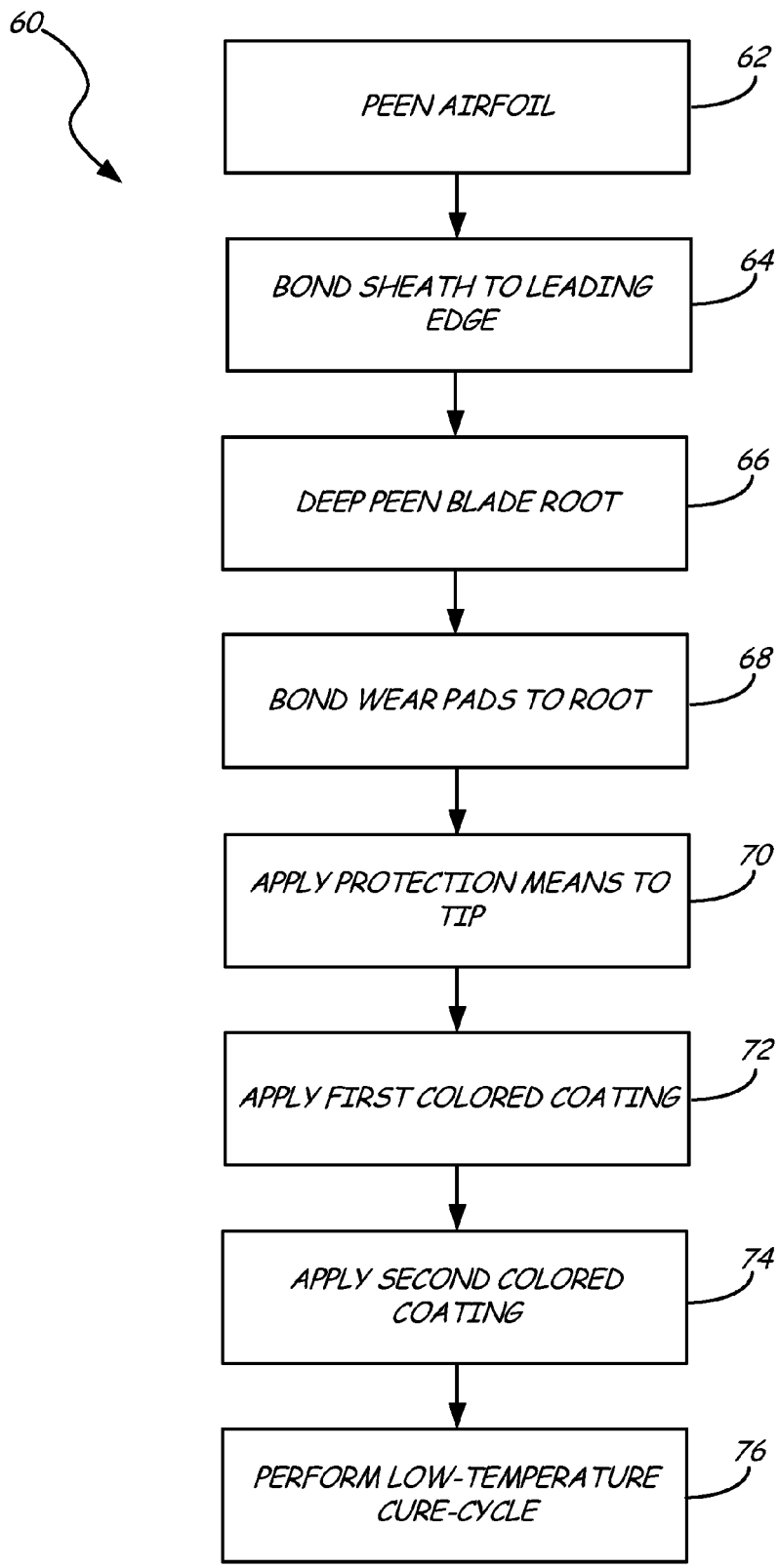
FIG. 3 shows a block diagram of a method for protecting a fan blade according to the current invention.

FIG. 3 shows a block diagram of a method for protecting a fan blade 30. Method 60 includes peening airfoil (step 62), bonding a sheath to the leading edge of blade (step 64), deep peening blade root (step 66), bonding wear pads to the root (step 68), applying a protective cover to blade tip (step 70), applying first and second coatings to exposed areas of blade (steps 72 and 74), and performing a low-temperature cure cycle (step 76).

Peening of airfoil (step 62) is generally done to leading edge 36 and cavities of airfoil 32 and imposes residual stresses at the surface peened. Peening can be done by shot peening, laser shock, ultrasonic, low plasticity burnishing or any other method generally known in the art. The imposing of surface stresses through peening results in resistance to fatigue and corrosion by resisting crack formation at these surfaces. This compressive strength from peening can keep cracks from propogating even if some pitting or corrosion on blade 30 does occur.

Sheath 42 is then bonded to the leading edge of blade 30 (step 64). Sheath 42 can be made of titanium or nickel or another material to add strength to protect leading edge 42 from impacts. Sheath 42 can be bonded onto blade 30 using an adhesive with a scrim sheet. The adhesive can be one of a variety of commercially available aerospace-quality metal-bonding adhesives, including several epoxy- and polyurethane-based adhesive films. An example of a suitable bonding agent is type EA9628 epoxy adhesive available from Henkel Corporation, Hysol Division, Bay Point, Calif. and type AF163K epoxy adhesive available from 3M Adhesives, Coatings & Sealers Division, St. Paul, Minn. In certain embodiments, the adhesive is a film. Scrim sheet is embedded into adhesive and provides dielectric separation between airfoil 32 and sheath 42, preventing galvanic corrosion between the two different metal surfaces of airfoil and sheath. The material forming scrim sheet is often determined by its compatibility with adhesive, and can be, for example, a flexible nylon-based layer with a thickness between about 0.002 inch (0.051 mm) and about 0.005 inch (0.127 mm) thick. The process of bonding sheath 42 to airfoil 32 can include a number of additional steps listed in U.S. patent application Ser. No. 12/974,427 entitled "Method for Securing a Sheath to a Blade" and filed on Dec. 21, 2010, which is hereby incorporated by reference. The scrim supported adhesive 48 can be extended about ½ inch (12.7 mm) beyond the edge of sheath 42 to minimize the potential of developing crevices at the interface between sheath 42 and blade 30.

Step 66 includes deep peening root 34 of blade 30. Deep peening can be done using shot peening, laser shock, ultrasonic, low plasticity burnishing or any other method generally known in the art. As discussed in relation to step 62, peening adds compressive strength to the surface of root 34, preventing cracks from forming and/or propagating. Root 34 is subject to deep peening to be able to protect blade root against deeper pitting or corrosion than the peening in step 62.

Bonding wear pads 46 to root 34 (step 68) is generally done with an epoxy adhesive that can include a scrim sheet. Pads 46 can be bonded to the bottom side of root 34 as well as extending up blade 30 neck. Wear pads 46 act to galvanically isolate blade 30 root 34 from the hub, which is generally made of titanium. This galvanic isolation helps to protect aluminum blade 30 root 34 from corrosion, as well as protect blade 30 neck during installation. Additionally, it can eliminate fretting or galling that can occur at root 34.

Applying a protective cover to tip 39 (step 40) is to protect blade 30 tip 39 from rubbing on and being worn away by a fan case. A protective cover applied in step 40 can generally either be formed by anodizing tip 39 or bonding a tip cap to blade 30 tip 39. Anodizing tip 39 can be done by making airfoil tip anodic for about 20 to about 25 minutes at about 15 volts in a solution of about 7.5% phosphoric acid at about 77 degrees F. (plus or minus about 5 degrees F.) and hard coating per AMS 2469. Anodizing generates an oxide layer on the tip surface which can protect tip surface by increasing resistance to corrosion and wear. A tip cap (see FIG. 4) as protection means could be made of titanium or a similar high-strength metal and bonded onto blade 30 tip in the same manner that the leading edge sheath is bonded onto blade 30.

Corrosion resistant coatings are next applied (steps 72 and 74). Corrosion resistant coatings can include a base coating that is a corrosion inhibiting primer of a first color. It can also include a second corrosion coating that is a second color. The second corrosion coating can be a thick urethane polymer type coating to prevent moisture from reaching blade 30 and causing erosion. The coatings are generally applied to all exposed areas of blade 30. The use of a two color system, which can use a lighter color base coat and a darker color top coat, allows easy blade inspection to know when each coating is breached and therefore know when reapplication is needed. The coating applied to the pressure side of airfoil 32 can also be applied thicker, as the pressure side of airfoil 32 is generally subject to more erosion damage.

Blade 30 is then cured in a low-temperature cure cycle (step 76). A low temperature cure cycle can be at or below about 150 degrees Fahrenheit. A low temperature cure cycle helps to preserve the fatigue improvements and resistance to pit growth that the peening and deep peening have imparted to blade 30 in steps 62 and 66.

Method 60 for protecting a fan blade 30 helps to protect aluminum and aluminum alloy blades against their susceptibility to corrosion and erosion which can lead to reduced fatigue capability. This protection makes the use of the desirable light-weight aluminum alloy blade with a protective sheath possible. Galvanic corrosion is resisted through the use of scrim supported epoxy adhesive in bonding sheath 42 to blade 30 and wear pads 46 to root 34, tip protective cover on tip 39, wear pads 46 bonded to root 34, and corrosion resistant coatings. Erosion is resisted through the coatings applied, which can be in two colors to also provide a wear indicator. Blade 30 is protected against crevice corrosion through extension of the scrim supported epoxy beyond the edge of sheath 42 (and tip cap). And fatigue improvements and resistance to crack propagation and pitting is imparted through peening processes, and maintained through low temperature curing processes.

Figure 4:
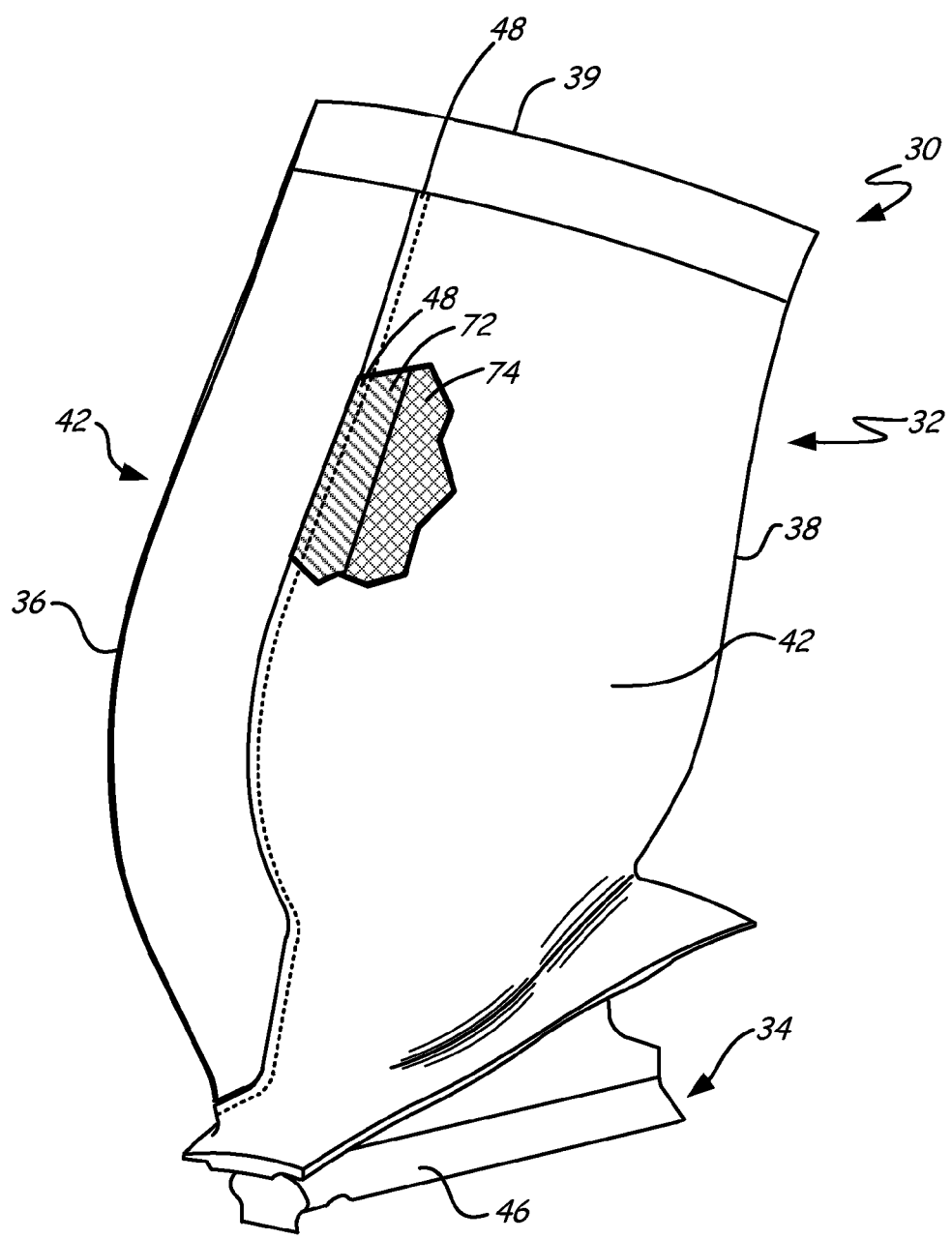
FIG. 4 shows an aluminum blade with a blade protection system with parts cut out to show different aspects of the protection system.

FIG. 4 shows an aluminum blade 30 with a blade protection system and with parts cut out to show different aspects of the protection system. Similar numbers are used for similar parts that are shown in FIG. 2. Blade 30 includes airfoil 32, root 34, leading edge 36, trailing edge 38, tip 39, suction surface 40 and sheath 42. Visible elements of corrosion protection system for blade 30 include tip cap 80, base corrosion inhibiting primer 82, erosion coating 84, extended scrim supported epoxy 48, and wear pads 46 on root 34.

In this embodiment, tip protection cover is tip cap 80 to protect tip 39 of blade 30 from rubbing on fan case. Tip cap 80 can be bonded on with a scrim supported adhesive, similar to that used to bond leading edge sheath 42 to blade 30. Scrim supported adhesive can also be extended beyond the edge of tip cap 80 about ½ inch (about 12.7 mm) to protect against crevice corrosion. Tip cap 80 may be made, for example, of titanium or other high strength metal or metal alloy.

Corrosion inhibiting primer 82 is applied over all visible surface of blade, including on top of extended portion of scrim supported adhesive 48. Erosion coating 84 is then applied on top of primer 82 to provide a second barrier of protection. Coating 84 is a different color than coating 82 to allow for easy detection when a coating needs reapplied and how many layers of coating have been breached. While FIGS. 2-4 have referred to a two-coating protection system, alternative embodiments can include only one coating to protect against erosion and corrosion.

In summary, the method of blade protection according to the current invention uses peening, tip protective cover, wear pads, coatings and specific low-temperature cure cycles to provides an aluminum blade (with a sheath) sufficient strength and protection to ensure it is suitable for use in aerospace engines. The protection system helps to overcome aluminum's susceptibility to corrosion and erosion, thereby ensuring that it performs as required and maintains full fatigue capability. The system allows for more strength and resiliency to resist deterioration, cracking and impact damage to blade 30, as well as to extend the serviceable life of blade 30.

The above examples of the relative sizes of the components of blade 30 is included for illustrative purposes only and can readily be adapted by one skilled in the art for a variety of engine and blade designs. The dimensions of sheath 36 and tip cap 80 can vary depending on a number of factors, including the size and shape of blade 30. The size and shape of blade 30 depend on the size and operating envelope of engine 10, which is itself often selected by the purchaser or end user of an aircraft utilizing engine 10. The discussion of blade as made of aluminum includes aluminum alloys. Similarly, the use of titanium or nickel in sheaths includes the use of alloys.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for protecting a fan blade with and airfoil, a tip, a root and a sheath, the root to be inserted into a hub, the method comprising
    peening an airfoil of a fan blade with an airfoil, a tip, a root and a sheath;
    inserting a scrim cloth between the fan blade and the sheath to galvanically isolate the fan blade from the sheath;
    bonding the sheath to the blade with an epoxy adhesive;
    peening the blade root;
    bonding wear pads to the root with epoxy adhesive to galvanically isolate the root from the hub;
    applying a protective cover to the tip of the blade;
    applying a coating to all exposed areas of the blade to inhibit corrosion; and
    performing a low temperature cure cycle on the blade.

2. The method of claim 1, wherein the low temperature cure cycle is at or below about 150 degrees Fahrenheit.

3. The method of claim 1, wherein the coating applied to all exposed areas of the blade comprises:
    a base coating in a first color; and
    a top coating in a second color.

4. The method of claim 3, wherein the base coating is a corrosion inhibiting primer.

5. The method of claim 1, wherein the step of applying a protective cover to the tip of the blade comprises:
    bonding a tip cap to the tip of the blade.

6. The method of claim 1, wherein the step of applying a protective cover to the tip of the blade comprises:
    anodizing the tip of the blade to form a protective cover.

7. The method of claim 1, wherein the peening of the root comprises a deep peening.

8. The method of claim 1, wherein the sheath is a titanium sheath.

9. The method of claim 1, wherein the adhesive used to bond the sheath to the blade is extended about ½ inch (12.7 mm) beyond the edge of the sheath.

10. The method of claim 9, wherein the adhesive extended beyond the edge of the sheath is coated with the coating applied to all exposed areas of the blade to inhibit corrosion.

11. A blade comprising:
    a blade with an airfoil, a leading edge, a trailing edge, a tip and a root for inserting into a hub, with the blade having gone through a peening process to impart residual stress to the blade;
    a sheath attached to the leading edge;
    a scrim supported epoxy that bonds the sheath to the blade and to galvanically isolate the blade from the sheath;
    wear pads attached to the root with epoxy adhesive to galvanically isolate the root from the hub;
    a cover to protect the tip of the blade; and
    a coating applied to all exposed areas of the blade to inhibit corrosion, wherein the coating comprises:
        a base coating in a first color; and
        a top coating in a second color.

12. The blade protection system of claim 11, wherein the root has a deep peened finish.

13. The blade protection system of claim 12, wherein the blade has gone through a low temperature cure cycle.

14. The blade protection system of claim 13, wherein the low temperature cure cycle is below about 150 degrees Fahrenheit.

15. The blade protection system of claim 12, wherein the cover to protect the tip of the blade is a tip cap bonded onto the tip of the blade.

16. The blade protection system of claim 12, wherein the cover to protect the tip of the blade is formed by anodizing the tip of the blade.

17. A method for protecting a fan blade, the method comprising:
- peening an airfoil and interior cavities of an Aluminum fan blade with an airfoil, leading edge, trailing edge, tip and root;
- bonding a sheath to the leading edge of the airfoil using a scrim supported adhesive extending about ½ inch (about 12.7 mm) beyond the edge of the sheath;
- deep peening the blade root;
- bonding wear pads to the root using a scrim supported adhesive;
- applying a protective cover to the tip of the blade; and
- applying a first coating in a first color to all exposed areas of the blade to inhibit corrosion;
- applying a second coating in a second color to all areas where the first coating was applied; and
- performing a low-temperature cure cycle on the blade.

18. The method of claim 17, applying the protective cover to the tip of the blade comprises one of: anodizing the tip of the blade to form a protective cover or bonding a tip cap onto the tip of the blade.

\* \* \* \* \*